Sept. 21, 1954 B. G. DONLEY 2,689,621
TRUCK WITH INTERRELATED MULTIPLE PRIME MOVERS, POWER
TAKE-OFF COUPLINGS, AND OPERATING CONTROLS THEREFOR
Filed Sept. 13, 1947 4 Sheets-Sheet 4
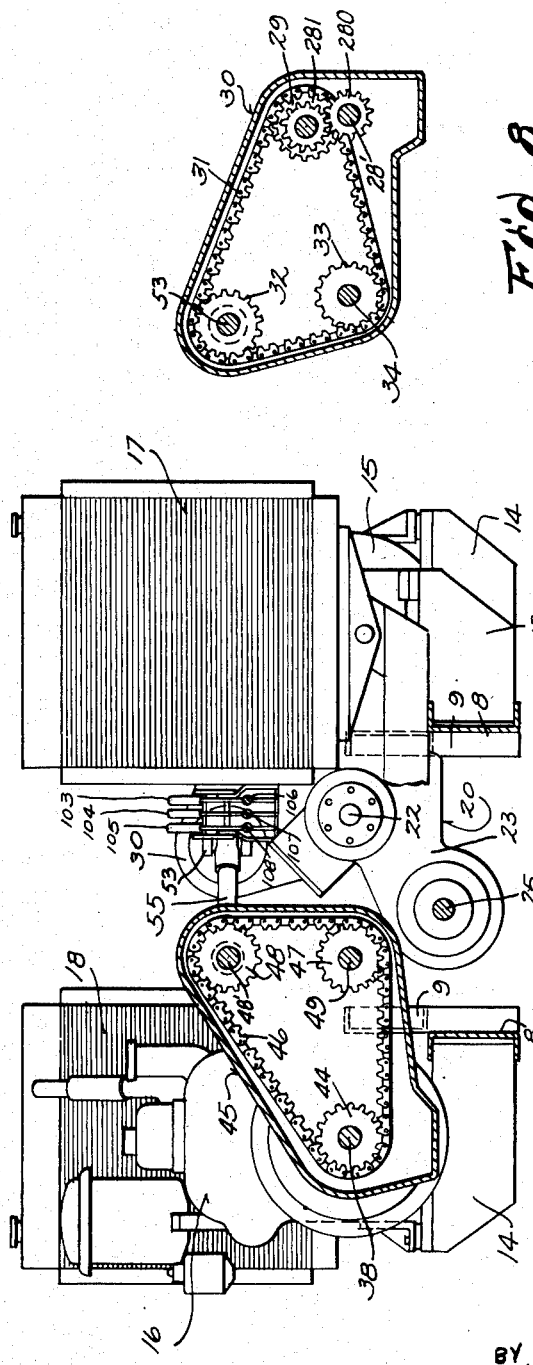
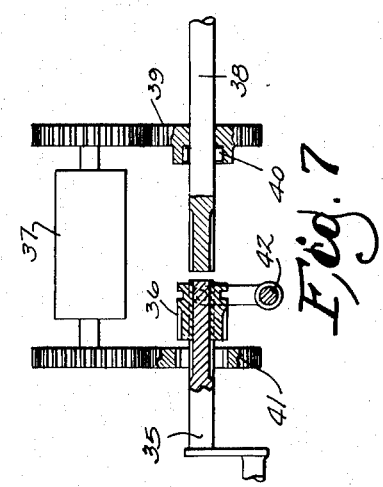
INVENTOR
BARTRUM G. DONLEY
BY Wheeler, Wheeler & Wheeler
ATTORNEYS Patented Sept. 21, 1954

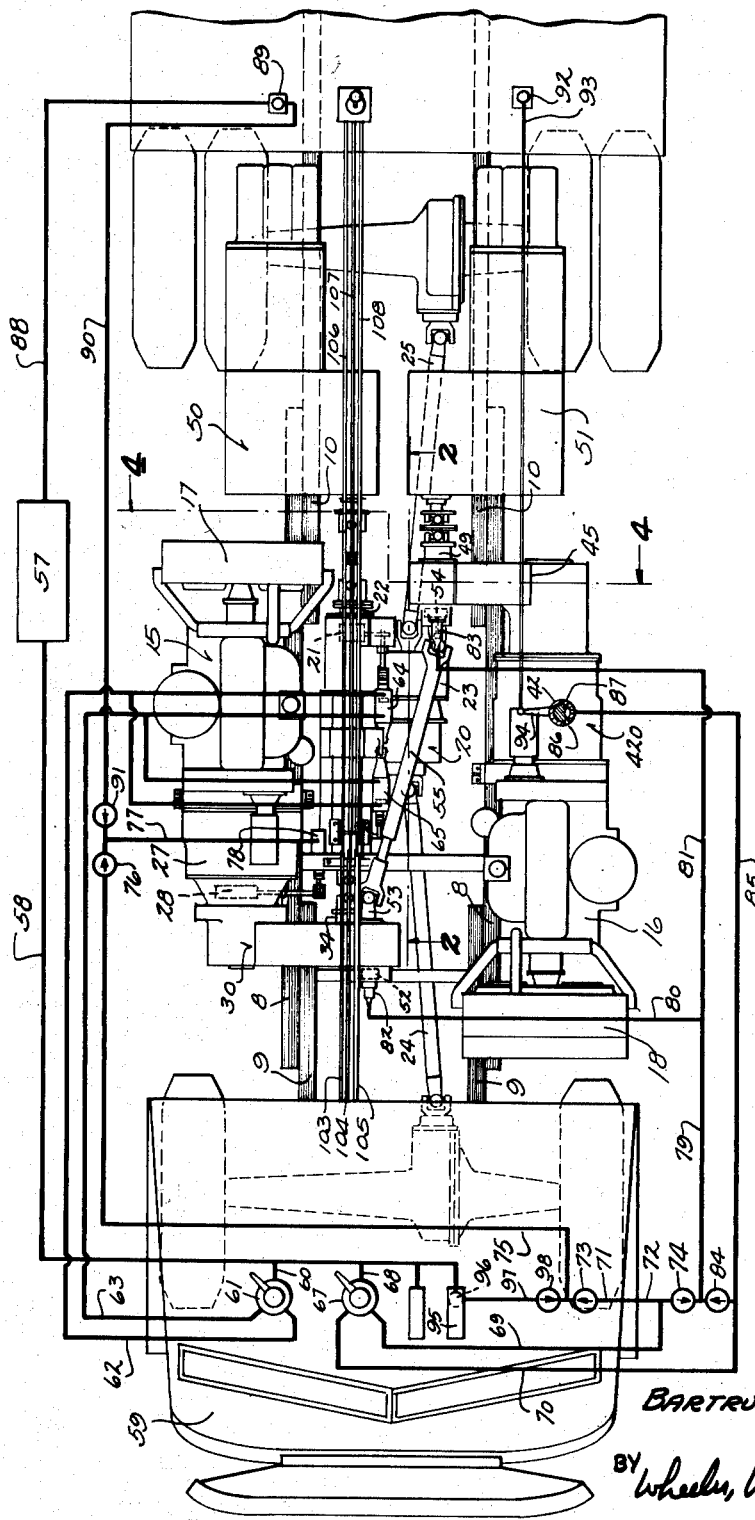

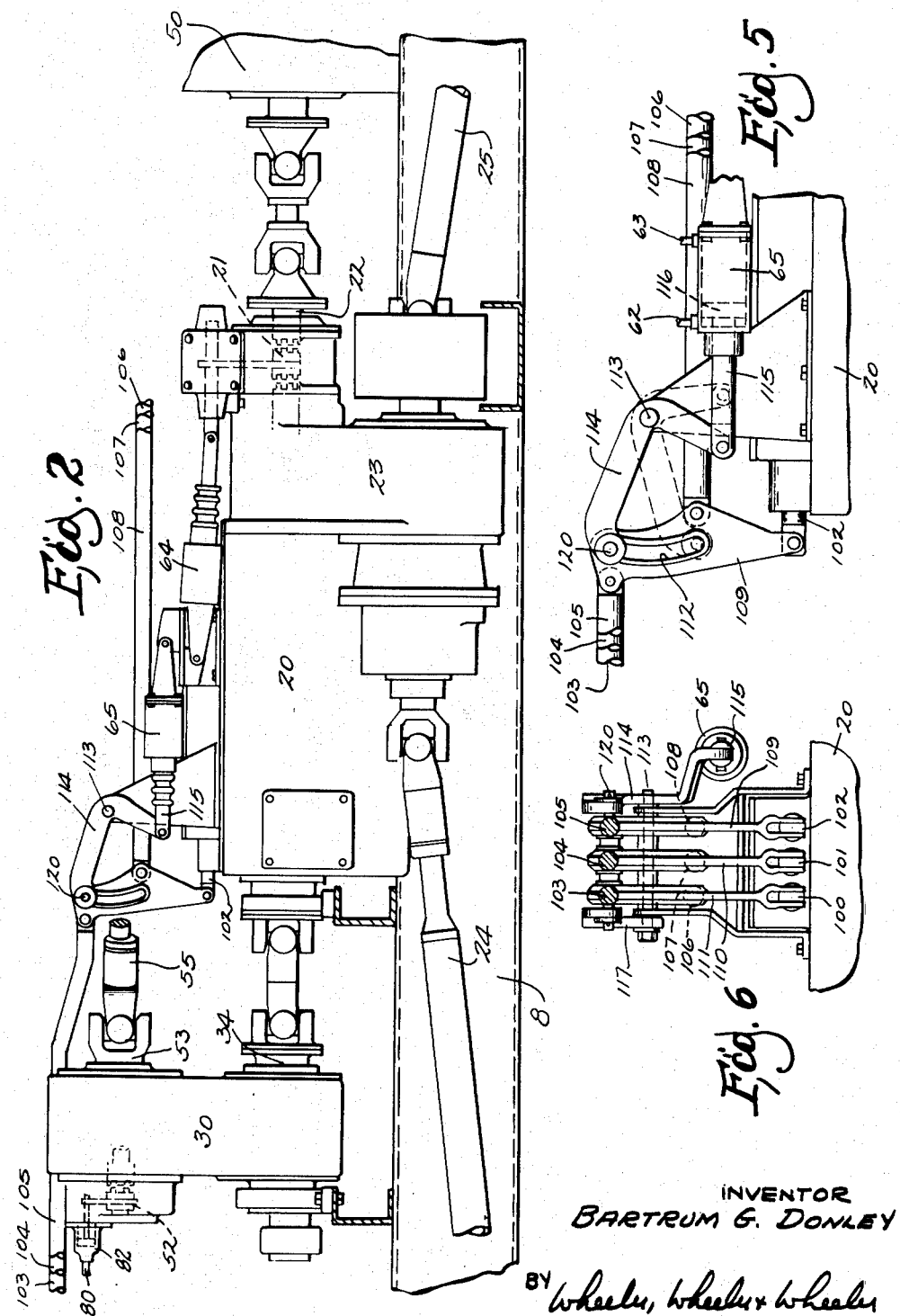

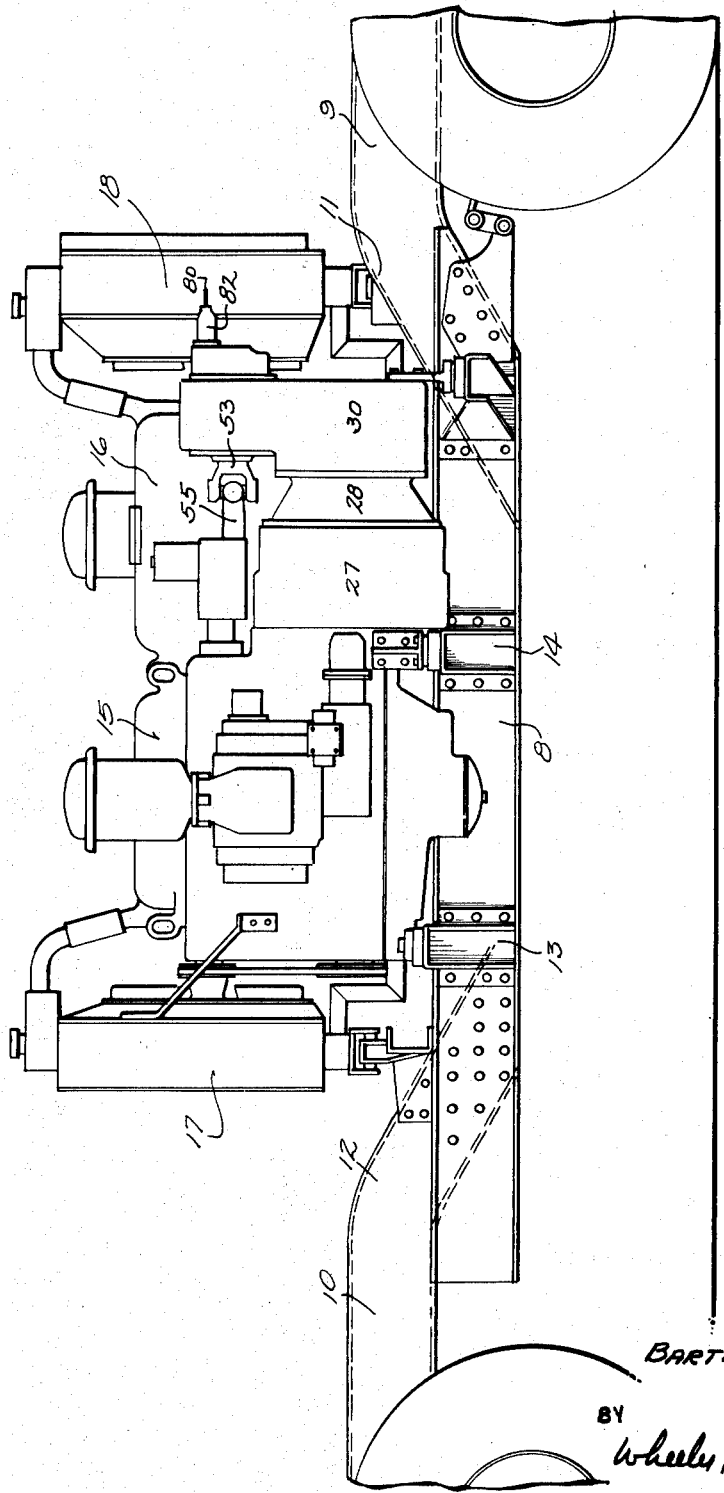

2,689,621

UNITED STATES PATENT OFFICE 2,689,621

TRUCK WITH INTERRELATED MULTIPLE PRIME MOVERS, POWER TAKE-OFF COUPLINGS, AND OPERATING CONTROLS THEREFOR

Bartrum G. Donley, Clintonville, Wis., assignor to The Four Wheel Drive Auto Company, Clintonville, Wis., a corporation of Wisconsin Application September 13, 1947, Serial No. 773,780

18 Claims. (Cl. 180—53)

This invention relates to improvements in trucks with multiple prime movers, the particular device disclosed being specifically designed for use for cementing oil well casings.

One of the important objects of the present invention is to provide a truck having a plurality of prime movers arranged in a novel organization behind the truck cab, and cross connections whereby both engines may be used to drive equipment mounted on the truck, or either engine may be used either for the propelling of the truck or to drive a part of such equipment. In connection with this object, it is a further purpose to provide suitable interlocking pneumatic controls for the several driving connections and clutches.

It is a further important object of the invention to provide a means whereby the gear shift transmission normally employed in driving the truck is alternatively usable for the drive of ancillary equipment mounted on the truck and, accordingly, is provided with controls operable either from the truck cab, or from an operator's station behind the cab on the bed of the truck. It is my further purpose to provide suitable means for selecting the position from which the transmission will be operable, the selecting means being so designed that the gear shifting rods may be operated from one station or the other, but not from both simultaneously.

It is a further object of the invention to provide a novel engine mounting and a novel truck frame for accommodating the engines and their cross connections.

The foregoing statement of objects identifies the purposes of the invention only broadly. For a detailed explanation of my purposes, reference is made to the accompanying drawings and the following description.

In the drawings:

Fig. 1 is a plan view of a truck embodying my invention, omitting the cab and body, and upon which I have superimposed a diagram of the pneumatic control system.

Fig. 2 is a view in vertical longitudinal section on the line 2—2 of Fig. 1.

Fig. 3 is a view of the truck in right side elevation.

Fig. 4 is a view in transverse section on the line 4—4 of Fig. 1.

Fig. 5 is a view of the station selector in side elevation.

Fig. 6 is a view of the station selector in front elevation.

Fig. 7 is a diagrammatic plan view of the torque changer and its control.

Fig. 8 is a diagrammatic view in vertical section through the forwardmost of two similar chain transmission casings.

As best shown in Fig. 3, the truck frame has a dropped central section at 8. The front portion 9 and the rear portion 10 of the truck frame are conventionally made of side channels having their flanges turned inwardly. These channels are bent downwardly at 11 and 12 respectively and welded back to back with side channels 8 which have their flanges turned outwardly.

The side channels 8 are connected by suitable transverse members as required and are provided with outboard brackets 13 and 14 for the radiator end and output end respectively of the respective prime movers 15, 16. These heavy duty internal combustion engines are thus carried with their lines well offset outwardly from the sides of the frame and at a relatively low level made possible by the dropped frame sections 8.

As will be observed in Fig. 1, the engines face in opposite directions, the radiator 17 of prime mover 15 being disposed rearwardly, while the radiator 18 of prime mover 16 is disposed forwardly. The engines are also slightly offset in a direction longitudinally of the truck, the engine 15 being farther to the rear than engine 16.

Between the two engines, in a position generally conventional on four wheel drive trucks, is the gear shift transmission 20. The power output from transmission 20, as determined by the conventional combinations of gear pairs therein, passes through an output clutch 21 whereby the power may be selectively delivered either to a power take-off shaft 22, or through a conventional chain transmission case 23 to the line shafts 24, 25 leading to the respective differentials of the front and rear axles. The general organization of such a transmission is shown in U. S. Patent No. 2,395,108.

The power communicated through the change speed transmission 20 to the wheels ordinarily comes from the prime mover 15. The heavy duty engine 15 drives, through a hydraulic clutch 27 and friction clutch 28, an output shaft 28' connected through meshing reverse gears 280 and 281 the input sprocket 29 in a generally triangular chain drive housing 30. The chain 31 therein passes about sprockets 29, 32 and 33. Sprocket 32 is at the top of the housing, and sprocket 33 at the lower inside corner. Sprocket 33 connects directly with the input shaft 34 which drives the gear shift transmission 20.

Prime mover 16 has its crank shaft 35 selectively engageable by means of clutch 36 with the drive through the torque converter turbine diagrammatically shown at 37 (Fig. 7), or, alternatively, in direct drive connection with the output shaft 38. The rotor 39 which communicates the output of the torque converter 37 has an over-running clutch connection at 40 with output shaft 38, so that when clutch 36 is engaged with the input rotor 41 to drive through the torque converter, the output motion from the torque converter will be transmitted to shaft 38. Rotor 39 and the torque converter 37 will, however, be idle when the clutch 36 is in position for direct drive to shaft 38. The torque converter is merely illustrated diagrammatically, since it comprises no part of the present invention. It is illustrated only as a means of showing how it is connected by means of its operator 42 to effect the operation of the pneumatic controls hereinafter to be described.

The output shaft 38, driven from crank shaft 35 of engine 16, drives the input sprocket 44 in the chain transmission case 45. This transmission case is similar to that shown at 30. Its transmission chain 46 operates over sprockets 44, 47 and 48. The sprocket 47 is mounted on a power take-off shaft 49 at the lower inside corner of the transmission case. Sprocket 48, mounted on its stub shaft 48', is at the top of the generally triangular transmission case 45.

During the operation of the truck in cementing an oil well casing, the power take-off shaft 22, ordinarily driven from engine 15 through the change speed transmission 20, drives the input shaft of a high pressure pump 50. The power take-off shaft 49, ordinarily operated from engine 16 through the mechanism just described, drives the input shaft of a low pressure pump 51.

A cross connection is provided whereby either engine can operate the truck, and either engine may be employed to operate either of the pumps. It is extremely important that the two engines shall selectively be available to operate either pump, inasmuch as power failure during the actual cementing of an oil well casing might have disastrous results.

The cross connection between the two units is provided by means of a clutch at 52 whereby the top chain sprocket 32 of the forward chain transmission case 30 may be engaged to drive an output shaft 53 at the top of such case. Similarly, a clutch 54 may be engaged to enable the top sprocket 48 in the rearward chain transmission case 45 to be coupled to the flexibly jointed cross shaft 55 which transmits motion from either engine to the parts normally driven by the other. The means by which the respective clutches are provided with interlocking controls will hereinafter be described. For the present, it is desired to note that with the clutch 28 of engine 15 disengaged, power may be transmitted from engine 16 through the rearward chain transmission case 45 and the cross shaft 55 and forward chain transmission case 30 to the gear shift transmission 20 and thence, at a rate determined by the gears therein, either to the drive shafts or to the high pressure pump 50. Similarly, with clutch control 42 in its neutral position and clutches 52 and 54 engaged, power may be transmitted from engine 15 through the forward chain transmission case 30 and the cross shaft 55 and the rearward transmission case 45 to the low pressure pump 51. While these pumps are referred to as high and low pressure pumps, it will be understood that this term is relative. For the particular intended purpose, the high pressure pump develops up to twelve thousand pounds per square inch, and the so-called low pressure pump develops up to seven thousand pounds per square inch.

It will, of course, be understood that the present invention is by no means limited to the operation of concrete pumps, but may be employed to operate any ancillary apparatus mounted on a truck or otherwise.

For operating the various clutches and also providing an interlock to preclude improper operation thereof, I have a system of fluid controls which, as illustrated to exemplify the invention, use air pressure from an air tank 57. Air may be pumped into the tank 57 from any desired source, as, for example, from an air compressor (not shown) driven by engine 15. An air supply line 58 runs from the tank to the engine cab 59 within which a number of the controls are located. A branch pipe 60 leads to a control valve 61 for selectively delivering pressure into either of the lines 62 or 63. Each of these lines divides and leads to the corresponding ends of double-acting cylinders 64 and 65, wherein pistons are operable as indicated in dotted lines. The piston in cylinder 64 is operatively connected to actuate the clutch 21, while the piston in cylinder 65 is operatively connected to actuate a selector mechanism for the controls which shift the gears in the change speed transmission 20. The selector mechanism will be later described. Its purpose is to enable the gears in the transmission case 20 to be shifted either from the cab, or from the operator's station at the rear of the truck. The pneumatic connections are such that when the gears are capable of being shifted from the cab, the clutch 21 is simultaneously shifted to disengage the power output of the transmission 20 from the take-off coupling 22, and to clutch the transmission 20 to the drive through the chain case 23 to the respective wheels. Conversely, when the control cylinder 65 is pneumatically energized, the selector is positioned to permit operation of the gears in the case 20, from the rear of the truck. The clutch 21 is simultaneously shifted by the pneumatic energization of cylinder 64 to de-clutch the gear transmission 20 from the wheels and to clutch the gear transmission to the power take-off 22.

The three-way valve at 67 receives high pressure air through the branch line 68 and delivers such air selectively through lines 69 or 70, according to the position of the valve. The line 69 divides, communicating with lines 71 and 72, each of which is provided with a check valve 73, 74 through which the air will pass freely in a direction away from the control valve 67. From check valve 73, the air follows line 75 to another check valve at 76 and then follows line 77 to the pneumatic cylinder 78 which disengages clutch 28 of engine 15. From check valve 74, the air also passes through lines 79 to branch lines 80 and 81. Line 80 leads to the control cylinder 82 for clutch 52. When the cylinder 82 is pneumatically energized, the clutch 52 is engaged to couple sprocket 32 in the forward chain transmission case 30 with the outputs shafts 53, 55. The branch line 81 leads to the pneumatic cylinder 83 which, when pneumatically energizing, shifts clutch 54 to engage sprocket 48 in the rear chain transmission casing 45 with the cross shaft 55. Thus, the simultaneous energization of cylinders 82 and 83 will engage both clutches and complete a cross drive between the two transmission chains, at the same time disengaging engine 15 from the transmission chain 31 in the forward case 30. This establishes engine 16 as a source of power for driving through the change speed transmission 20 either to the take-off coupling 22, or the wheels of the truck, according to the adjustment of clutch 21.

Assuming the control valve 67 to be swung to its opposite position whereby air is supplied to line 70, such air will pass through check valve 84 into lines 79, 80 and 81 to energize the cylinders 82 and 83 for engaging the cross shaft clutches 52 and 54 as already described. In addition, however, the air will pass through line 85 to a valve 420 which is associated with the rock shaft 42 which shifts clutch 36 either for direct drive, or drive through the torque converter from engine 16. The valve 420 has two relief ports at 86 and 87 respectively. When the clutch shifter 94 is in its neutral position, the valve 420 is closed and does not afford communication between line 85 and either of these relief ports. However, if the clutch shifter 94 is moved in either direction to engage either clutch, the valve 420 will place line 85 in communication with one or the other of the relief ports to bleed pressure from line 70 and thereby to preclude the pneumatic engagement of clutches 52 and 54 from line 70. Thus, the purpose of valve 67 is to preclude the engagement of the cross shaft clutches 52 and 54 when engine 16 is being controlled from the rear station. With valve 67 in the position first described, the cross shaft clutches 52 and 54 may be engaged to transmit the power of engine 16 through the cross shaft. The power of engine 15 may likewise be transmitted through the cross shaft to operate the power take-off coupling 49 to the low pressure pump 51 or such other apparatus as is driven from that coupling. This is done from the rear station only with the valve 67 set to deliver pressure through line 70 to the bleed valve 420.

To enable the clutch of engine 15 to be controlled from the rear station, a separate line 88 from the air tank 57 leads through control valve 89 at the rear station, through the line 90 which communicates through check valve 91 with line 77 to the operating cylinder 78 for friction clutch 28. Also disposed at the rear station is a manual control 92 having linkage diagrammatically illustrated at 93 which leads to a lever 94 connected with rock shaft 42 and valve 420. Thus, from the rear station, the clutch 36 of engine 16 can be set in neutral, and when it is in neutral, with valve 61 set for control of the gear shift from the rear station, the clutches 52 and 54 and 28 may all be engaged for transmission of engine power from engine 15 through the two chain transmission cases 30 and 45 and the intervening cross shaft 55 to the power take-off coupling 49.

Engine clutch 28 may also be controlled pneumatically from the clutch pedal 95 which operates a valve diagrammatically shown at 96 controlling communication from the pressure line 58 through conduit 97 and check valve 98 to line 75, whence pressure is communicated to the clutch actuator 78 in the manner already described.

It will be noted that each of the several clutch actuating lines 75, 77 and 79 may be energized from more than one valve, and each has its origin between a pair of check valves which are oppositely directed to permit the air to enter the line to the respective clutch actuating cylinder from either direction by precluding any back pressure from leaving such line in the opposite direction.

Projecting forwardly from the top of the change speed transmission case 20 are the usual gear shifting plungers 100, 101, 102 (Fig. 6). It is customary to operate such plungers by links extending into the cab, and there selectively picked up for operation by the usual gear shifting lever (not shown). Links comprising a part of a system of linkage leading to the cab are illustrated at 103, 104 and 105 respectively. Corresponding links 106, 107 and 108 comprise part of a suitable system of linkage running to the control station on the rear of the truck. It is not deemed necessary to show the manner in which these links are conventionally operated by the shifting levers, as such operation is well-known.

As already explained, it is desirable to provide means whereby the gear shifting plungers 100, 101 and 102 may be operated either from the cab, or from the rear control station, but not from both simultaneously. To this end, I have provided a selector mechanism best shown in Figs. 5 and 6.

In this system, a vertical lever 109 is connected at its lower end with the gear shifting plunger 102, and at its upper end with link 105. At an intermediate level, the lever 109 has pivotal connections with the operating link 108 from the rear control station.

Similarly, the central lever 110 is connected at its bottom with plunger 101, and centrally with link 107, and at its top with link 104. The remaining lever 111 is connected at its bottom with plunger 100, centrally with link 106, and at its top with link 103.

The several levers have transversely registering arcuate slots 112 which are concentric with a pintle 113 upon which the bell crank 114 is oscillatable. This bell crank has its end pivoted to connecting rod 115 which is carried by piston 116 operating in cylinder 65. Pressure admitted to the cylinder through line 62 operates the piston to the right as viewed in Fig. 5 to oscillate the bell crank 114 counterclockwise, while pressure admitted through the line 63 actuates the bell crank 114 clockwise. At the other end of pintle 113 is a rocker arm 117. The bell crank 114 and rocker arm 117 carry from pintle 113 a floating pintle 120 which extends through the registering slots 112 of the several levers. When the bell crank 114 is in the position shown in full lines in Fig. 5, the pintle 120 registers with the several links 103, 104, 105 which lead from the cab. When the bell crank 114 is in the position shown in dotted lines in Fig. 5, the floating pintle 120 is at a level such that it registers with the several links 106, 107 and 108 leading from the rear control station.

It will be evident from an analysis of Fig. 5 that with the floating pintle in its uppermost position as shown in full lines, the front control links cannot actuate lever 109 because they register with the pintle upon which it is then fulcrumed. However, the rear control links may readily be manipulated from the rear control station to shift their respective levers and thereby to actuate the respective push rods or plungers for shifting the gears in transmission 20.

With the bell crank 114 oscillated to the dotted line position of Fig. 5, the floating pintle 120 now registers with the links from the rear control station, making it impossible for these links to move and to operate the lever 109. However, it is now possible to manipulate any of these levers from the front control station by actuating the proper link and thereby oscillating the appropriate lever about the floating pintle to shift the corresponding gear shifting plunger.

The operation of the truck from the front and rear stations is as follows:

*Front station.*—This station is used primarily to control the movement of the vehicle. From this station the wheels may be powered from either of engines 15 or 16, and the gears in transmission 20 shifted by rods 103, 104 and 105. Valve 61 is set to engage transmission 20 through clutch 21 to the drive wheels through chain case 23. Such setting simultaneously sets the selector mechanism shown in Figs. 5 and 6 to prevent control of the transmission from the rear station, and disengage the take off coupling 22 from clutch 21. With no further manipulation of the controls the vehicle is powered from engine 15. If however, the manual control 92 at the rear station be preset for power transmission from engine 16 to the output shaft 38, engine 15 may be disengaged and engine 16 engaged for vehicle drive through cross shaft 55 by setting valve 67 to pressurize line 69, which simultaneously actuates clutch actuator 78 and the clutches 52 and 54 in the manner aforesaid to disconnect engine 15 and connect engine 16.

*Rear station.*—This station is used primarily to control the equipment powered from the take-off shafts 22 and 49. Valve 61 is first set to engage transmission 20 through clutch 21 to the take-off shaft 22, thereby inactivating the drive to the wheels. Transmission 20 is then controlled from the rear station through rods 106, 107 and 108, and control of the transmission from the front station is prevented. If valve 67 be preset to "off" position, clutch 52 and 54 will be disengaged and engine 15 will power only shaft 22. If valve 67 be preset to pressurize line 70, and if the clutch shifter 42 be in neutral position, clutches 52 and 54 will be engaged and engine 15 will be connected both to take-off shaft 22, through the transmission 20, and to take-off shaft 49, through cross drive shaft 55. To transfer input to shaft 49 from engine 15 to engine 16, manual control 92 is set to engage clutch 36, either directly or through the torque converter 37, to shaft 38. Air will simultaneously be bled from line 70 through port 420 to disengage clutches 52 and 54 in the manner aforesaid, whereupon engine 16 drives shaft 49 and engine 15 is disconnected therefrom. If it is then desired to cut the power to shaft 22, valve 89 may be set to pressurize line 90 which, through clutch actuator 78, declutches engine 15.

If it is desired that engine 16 power only shaft 49, valve 67 is preset to "off" position thereby inactivating clutches 52, 54. Power is then delivered by engine 16 to shaft 49 only. If line 90 be simultaneously pressurized, thereby declutching engine 15, only shaft 49 receives power. If it be desired to power both take-off shafts 49 and 22, from engine 16, valve 67 must be preset to pressurize line 69, whereupon the setting of manual control 92 will have no effect on the clutches 52 and 54 which will be permanently engaged. In this arrangement engine 15 is disengaged by pressurizing line 90 to declutch clutch 28, as aforesaid, and both couplings 22 and 49 will receive power solely from engine 16.

It will be apparent from the foregoing description that I have provided a duplex power plant with multiple power outlets and cross connections for enabling either outlet to be actuated from either source of power. It will also be evident that I have provided arrangements whereby the various connections may be operated from two distinctly separate control stations to actuate power outlets appropriate for those stations.

I have also provided interlocking controls whereby the mechanism is protected from improper operation when the intended regulation is set up for control from one station or the other. In some instances, the interlock is pneumatic, while in other instances it is mechanical. Where the interlock has been adequately effected, there are some instances in which it is brought about by the positive shifting of some part, while, in other instances, the interlock is effected by bleeding off the air pressure to preclude operation in the event of an improper hook-up.

The disposition of the truck engines not only facilitates their cross connection for the stated purposes, but has advantages in the operation of this type of truck in that the engines are entirely accessible, and the cab can be located in a relatively low position in the extreme forward end of the truck. The engines are not only balanced, but, due to the drop frame, the forward chain transmission 30 can be located at a level to drive directly from the outboard engine to the shaft input of the speed changing transmission 20 without displacing such transmission from its normal position in a four wheel drive truck.

I claim:

1. A duplex power plant comprising a pair of parallel engines side by side and reversed end for end, each engine being provided with an output shaft and a clutch having parts connected to said engine and said output shaft, a pair of output transmissions, each comprising at least three rotors and motion transmitting connections in driving connection to said rotors, the output shaft of each engine being connected to one rotor in respective transmissions, power take-off couplings operatively connected with a second rotor in each of the respective transmissions, clutches connected to the third rotors of the respective transmissions, and a cross shaft independent of the output shafts and connected to the third rotor clutches of both transmissions, said cross connection comprising means whereby each transmission and power take-off may be actuated by either engine.

2. A multiple engine combination comprising a pair of engines having output shafts, clutches connected to each of said output shafts and to said engines whereby respective output shafts may be controlled, a pair of transmissions, each including at least three sprockets and chains connecting the respective sprockets, one sprocket of each transmission being connected with the output shaft of each engine, power take-off couplings connected with a second sprocket of the respective transmissions, a cross shaft and a clutch connected to each end of said cross shaft, said clutches being also connected to the third sprockets of each transmission, said cross shaft and clutches comprising means whereby each power take-off coupling may be driven from each engine.

3. The combination set forth in claim 2 in further combination with a set of interlock controls operatively connected with the respective cross shaft clutches and regulating the operation thereof to selectively preclude simultaneous connection of both engines with one of said transmissions.

4. The combination set forth in claim 2 in further combination with a set of interlock controls operatively connected with the respective cross shaft clutches and regulating the operation thereof to preclude simultaneous connection of both engines with one of said transmissions, said interlock comprising fluid lines having terminal cylinders and pistons mechanically connected with the respective cross shaft clutches, and valves in said lines for selectively controlling said lines.

5. The combination with a plurality of power take-off couplings, of plural means for driving the respective couplings and comprising separate engines having power output shafts and clutches controlling said shafts, motion transmitting connections from the respective shafts to the respective couplings, and a cross connection including a clutch between said said motion transmitting connections, together with a fluid pressure control system for said cross connection clutch comprising a clutch operating cylinder, a piston therein provided with a link connected to the clutch, a fluid pressure line to the cylinder, and a control valve regulating pressure communication through said line.

6. The combination with a plurality of engines and a plurality of power output shafts and driving connections from the respective engines to the respective shafts, and a cross connection for coupling each engine to the shaft normally driven from the other, of clutches controlling the said driving connections and a clutch controlling said cross-connection, operators for the respective clutches, the operator for the cross connection clutch comprising a fluid cylinder and piston, and the driving connection clutch operators having a valve connected thereto, said valve including a bleed port and a valve member, said valve member being connected to bleed pressure from the cross connection clutch cylinder when the clutch operator with which the valve member is connected is in clutch-engaging position.

7. In a truck, a frame having supporting axles and wheels across which said frame extends approximately horizontally, said frame having side members at a lower level between said wheels than at said wheels and toward which side members at said lower level both ends of said frame are curved downwardly, said frame having side members at its respective ends comprising channels with inwardly directed flanges, and the side members at a lower level comprising channels with outwardly directed flanges, the respective channels having means connecting the downwardly curved portions aforesaid to the channels with outwardly directed flanges back to back.

8. A truck comprising a frame provided with fore and aft portions, each having side frame members, and a dropped central portion having side frame members at a lower level than the side frame members first mentioned and connected therewith, a change speed transmission mounted between the side frame members of the dropped portion and having a power input shaft, brackets mounted on said last mentioned side members and projecting laterally outwardly from the frame, engines mounted on said brackets, one of said engines being provided with a clutch-controlled sprocket, a second sprocket connected with the input shaft of said transmission, a third sprocket, a chain passing about the three sprockets for motion transmission therebetween, and a clutch-controlled cross connection independent of the engine drive shafts from the other engine to said third sprocket.

9. The combination set forth in claim 8 in further combination with a power output coupling, a truck drive shaft, and clutch-controlled connections from said change speed transmission to said coupling and drive shaft respectively.

10. A multiple power plant comprising a plurality of engines, a plurality of output couplings, drive connections from each engine to its respective coupling, a plurality of drive connection clutches having parts connected to said engines and parts connected to said drive connections for the control of said drive connection, a cross connection having connections to the drive connections aforesaid whereby each engine may be coupled to either coupling, a plurality of control stations, drive connection clutch controls at the respective stations, and interlocking connections to said drive connection clutch controls.

11. In a device of the character described, the combination with a truck frame having forward and rearward control stations, of a change speed transmission having a control plunger, plunger-operating linkage leading toward said plunger from the respective stations, and a selector, means for connecting said plunger and linkage, said selector being connected to said linkage, said selector comprising interlock means for selectively rendering the linkage from one of said stations operative upon the plunger while at the same time rendering the linkage from the other station inoperative thereon.

12. The combination set forth in claim 11 wherein said change speed transmission comprises a power take-off shaft and a truck drive shaft, a clutch having parts connected to said power take-off shaft and said truck drive shaft for selectively coupling one of said shafts to the transmission, and an operating connection from said selector to said last mentioned clutch for shifting said clutch to a position dependent upon which linkage is operative upon the plunger.

13. The device of claim 11 in which a lever is pivotally connected with the linkage from the front control station and with the linkage from the rear control station and with said plunger, said lever having an adjustable fulcrum at said selector comprising means connected with the fulcrum for adjusting said fulcrum from registration with one linkage to a position of registration with the other.

14. In a device of the character described, the combination with a member to be operated and a plurality of separate operating connections therefor, of a lever with which said member and the respective connections are pivoted at spaced points, an adjustable fulcrum upon which said lever is pivotally movable, and a selector comprising means connected with said fulcrum and moving said fulcrum from a position of substantial registration with one of said connections to substantial registration with the other.

15. In a device of the character described, the combination with two operating rods and an operated rod, of a lever with which the several rods are in pivotal connection at spaced points, said lever having a slot extending substantially from the pivotal connection of one of the operating rods with the lever to the pivotal connection of the other operating rod with the lever, a selector provided with a mounting adjacent said lever, and a pintle carried by said selector and disposed within said slot and upon which said lever is pivotally movable for the actuation of the operated rod according to the position of the pintle adjacent the pivotal connection of the other operating rod.

16. The combination with a transmission comprising a plurality of shiftable rods for gear shifting purposes, of levers pivotally connected with the respective rods and provided at points spaced from said rods with corresponding slots extending away from said rods, a pair of operating links for each lever, a pivotal connection between corresponding links with the respective levers at corresponding ends of the slots of said levers, a pivotal connection between corresponding ends of the remaining links with the respective levers adjacent the corresponding other ends of said slots, a pintle providing a fulcrum common to said levers and extending through the slots thereof, and a selector connected to said pintle and mounted for the movement thereof from one position in proximity to one of said links to a second position in proximity to the other of said links whereby said levers are simultaneously conditioned to move their respective rods in response to manipulation of one set of links or the other according to the position of the common pintle.

17. A multiple power plant comprising a plurality of engines, a plurality of output couplings, drive connections including a clutch from each engine to a coupling, a transmission having speed change gears and including a part connected to a drive connection, a cross connection between the drive connections, said cross connection including clutch parts respectively connected to said drive connections whereby each engine may be coupled to either coupling, a gear shift mechanism for the transmission, a plurality of control stations, controls for the coupling clutches comprising fluid pressure lines, cylinder and piston operators, valves and connections from said piston operators to said coupling clutches, controls for the gear shift mechanism comprising a selector, said selector being provided with a cylinder and piston operator and operating valve, said selector cylinder and piston having a fluid line interconnected with the fluid line to one of the coupling clutch fluid lines whereby the position of the coupling clutch is interlockingly related to the position of the selector.

18. A duplex truck power plant comprising a pair of engines having output shafts and clutch parts on said shafts, a transmission for each engine, a power take off coupling for each transmission and a cross connection between transmissions, said transmissions each comprising three rotors and motion transmitting means connecting said rotors for rotation in unison, one rotor in each said transmission being provided with clutch parts coacting with respective clutch parts on said engine output shafts whereby the respective transmissions may be selectively driven by and disconnected from the respective engines, a second rotor in each transmission connected to respective power take off couplings, and a third rotor in each transmission, clutches for each said third rotor, said clutches having parts respectively connected to said third rotor and to said cross connection whereby said cross connection may selectively connect and disconnect said transmissions.

References Cited in the file of this patent

UNITED STATES PATENTS

| Number | Name | Date |
|---|---|---|
| 851,540 | Martin | Apr. 23, 1907 |
| 1,176,542 | Goldenstein | Mar. 21, 1916 |
| 1,288,679 | Reichenbach | Dec. 24, 1918 |
| 1,661,276 | Strid | Mar. 6, 1928 |
| 1,768,530 | Short | June 24, 1930 |
| 1,781,656 | Day | Nov. 11, 1930 |
| 1,890,623 | Scott | Dec. 13, 1932 |
| 1,972,224 | Herman | Sept. 4, 1934 |
| 2,180,724 | Sheldon | Nov. 21, 1939 |
| 2,186,999 | Stone et al. | Jan. 16, 1940 |
| 2,243,156 | Howe et al. | May 27, 1941 |
| 2,351,233 | Schon | June 13, 1944 |
| 2,384,782 | Rockwell et al. | Sept. 11, 1945 |

FOREIGN PATENTS

| Number | Country | Date |
|---|---|---|
| 23,883 | Great Britain | Dec. 10, 1914 |
| 176,851 | Great Britain | Mar. 23, 1922 |
| 593,796 | France | June 6, 1925 |